US009950390B2

(12) United States Patent
Sestini et al.

(10) Patent No.: US 9,950,390 B2
(45) Date of Patent: Apr. 24, 2018

(54) METHOD AND AN APPARATUS FOR MAKING LASER ENGRAVURES ON A MOVING WEB

(71) Applicants: HUNKELER.IT S.R.L., Leghorn (IT); EL.EN. S.P.A., Calenzano (IT)

(72) Inventors: Quirino Sestini, Rosignano Marittimo (IT); Giovanni Masotti, Sesto Fiorentino (IT); Carlo Giovannucci, Sesto Fiorentino (IT)

(73) Assignees: EL. EN. S.P.A., Calenzano (IT); HUNKELER.IT S.R.L., Leghorn (IT)

( * ) Notice: Subject to any disclaimer, the term of this patent is extended or adjusted under 35 U.S.C. 154(b) by 579 days.

(21) Appl. No.: 14/398,634

(22) PCT Filed: May 3, 2013

(86) PCT No.: PCT/IB2013/053550
§ 371 (c)(1),
(2) Date: Nov. 3, 2014

(87) PCT Pub. No.: WO2013/164804
PCT Pub. Date: Nov. 7, 2013

(65) Prior Publication Data
US 2015/0123318 A1    May 7, 2015

(30) Foreign Application Priority Data
May 3, 2012    (IT) ................ PI2012A0054

(51) Int. Cl.
*B23K 26/0622*    (2014.01)
*B23K 26/08*    (2014.01)
(Continued)

(52) U.S. Cl.
CPC ........ *B23K 26/0622* (2015.10); *B23K 26/082* (2015.10); *B23K 26/0846* (2013.01);
(Continued)

(58) Field of Classification Search
CPC .. B23K 26/0622; B23K 26/08; B23K 26/082; B23K 26/083; B23K 26/0846; B23K 26/402; B41J 2/442; B41J 2/471
See application file for complete search history.

(56) References Cited

U.S. PATENT DOCUMENTS

2010/0272961 A1* 10/2010 Costin, Jr. ............... B44C 1/228
428/156

FOREIGN PATENT DOCUMENTS

DE    10137006 A1    2/2003
EP    2103375 A1    9/2009
(Continued)

OTHER PUBLICATIONS

International Search Report dated Jun. 12, 2014, corresponding to International Patent Application PCT/IB2013/053550.

*Primary Examiner* — Stella K Yi
(74) *Attorney, Agent, or Firm* — Ladas & Parry LLP

(57) ABSTRACT

A method for making laser engravings on a web of paper, including prearranging a paper web conveying device; defining a working area along a path of the web; prearranging an emitter of laser pulses; prearranging a movable pointing device, selecting an engraving pattern to be engraved on the web; calculating an instruction file containing pointing instructions; selecting an emission power of the emitter of laser pulses; emitting laser pulses through the emission power; and operating the movable pointing device according to the instruction file.

14 Claims, 9 Drawing Sheets

(51) Int. Cl.
  *B41J 2/44*     (2006.01)
  *B41J 2/47*     (2006.01)
  *B23K 26/082*   (2014.01)
  *B23K 103/00*   (2006.01)
(52) U.S. Cl.
  CPC .............. *B41J 2/442* (2013.01); *B41J 2/471* (2013.01); *B23K 2203/40* (2015.10); *B23K 2203/50* (2015.10)

(56) References Cited

FOREIGN PATENT DOCUMENTS

| | | |
|---|---|---|
| IT | PI2008A000075 | 12/2009 |
| WO | 9847035 | 10/1998 |
| WO | 2008015550 A2 | 2/2008 |
| WO | 2012013818 A1 | 2/2012 |

\* cited by examiner

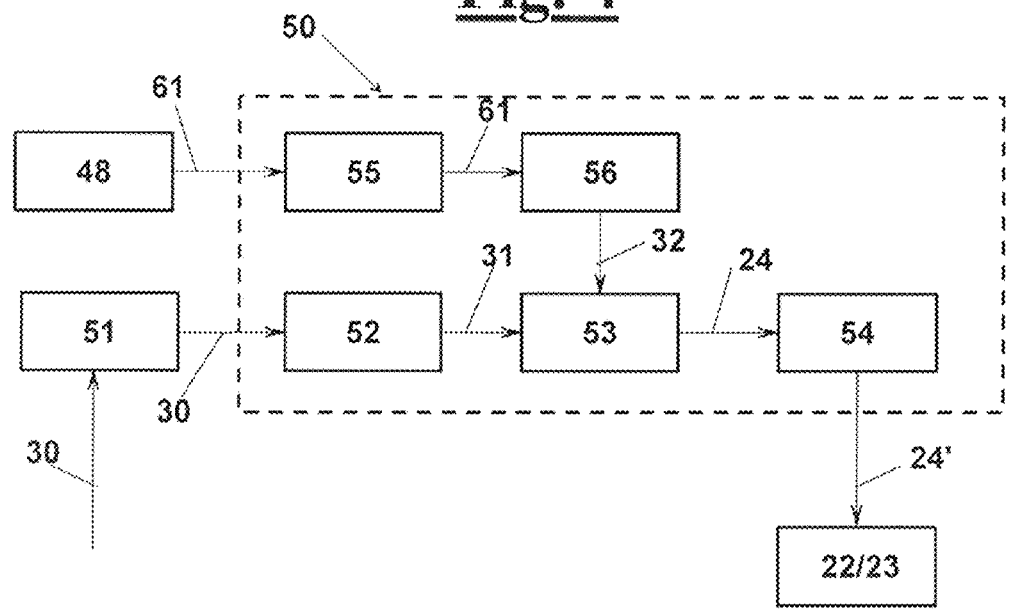
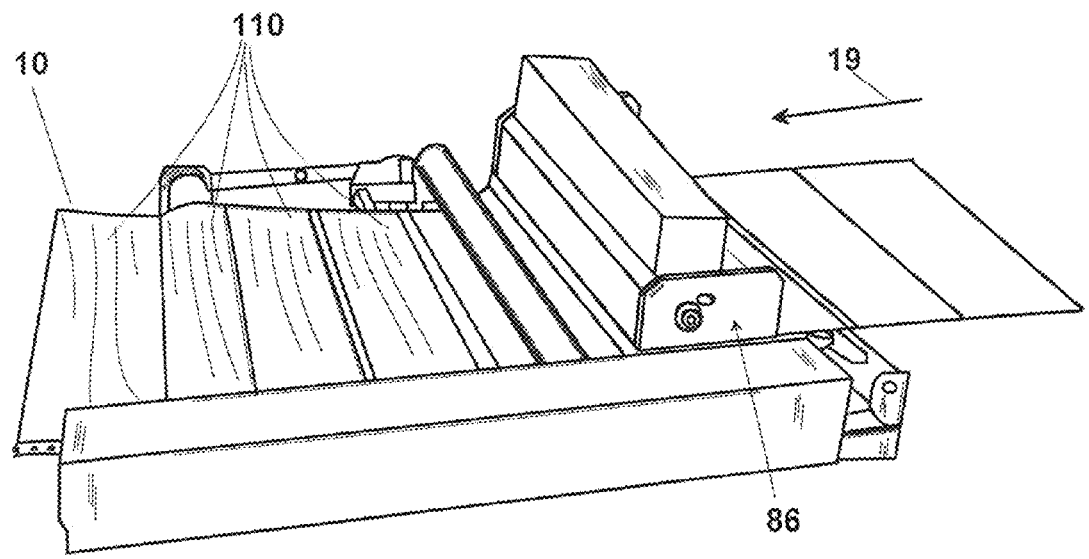

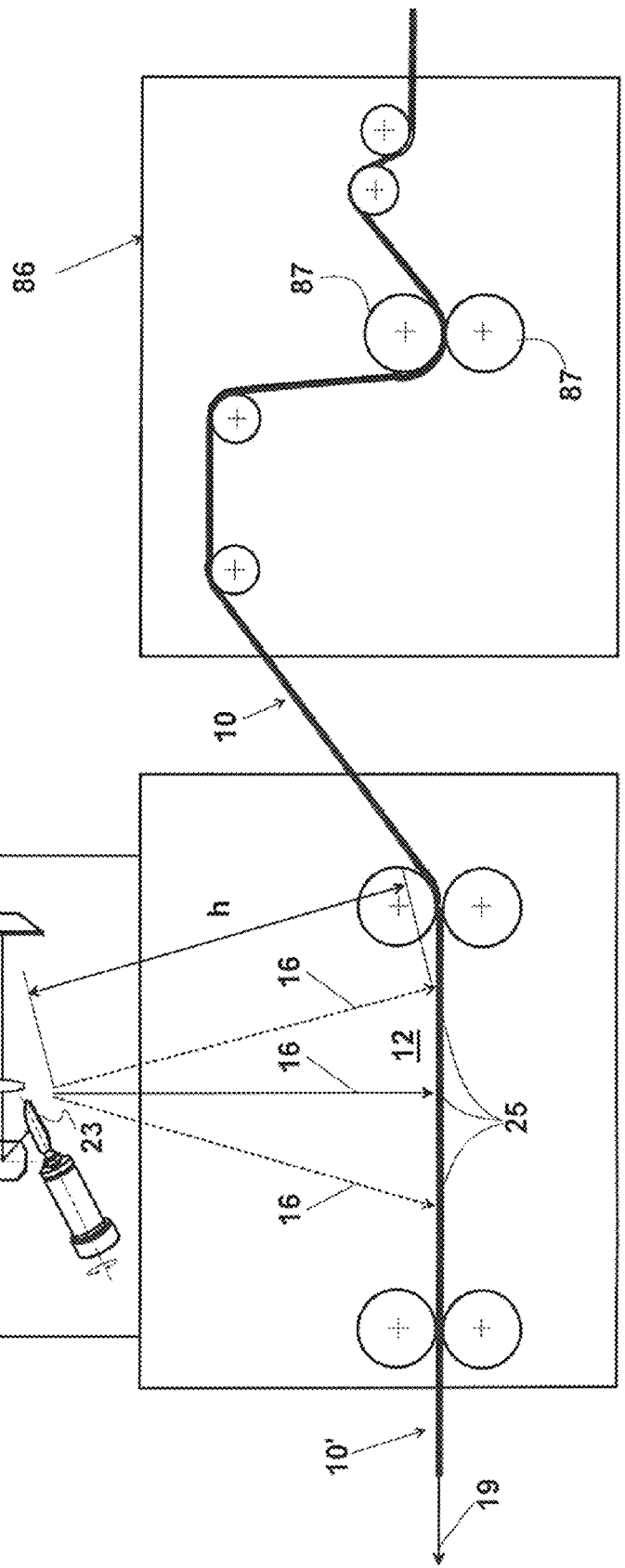
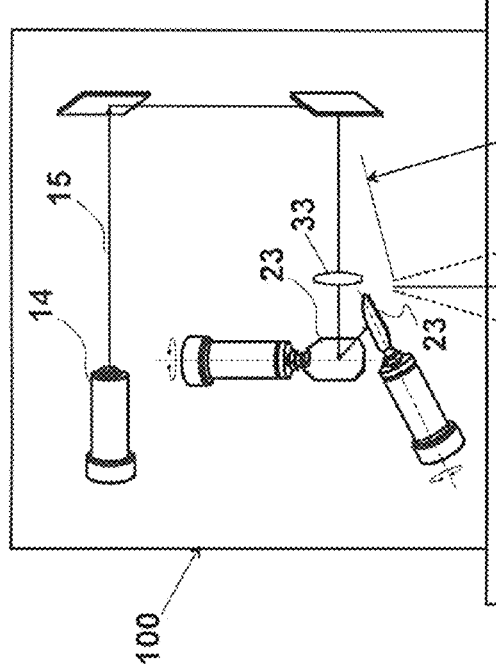
Fig. 5

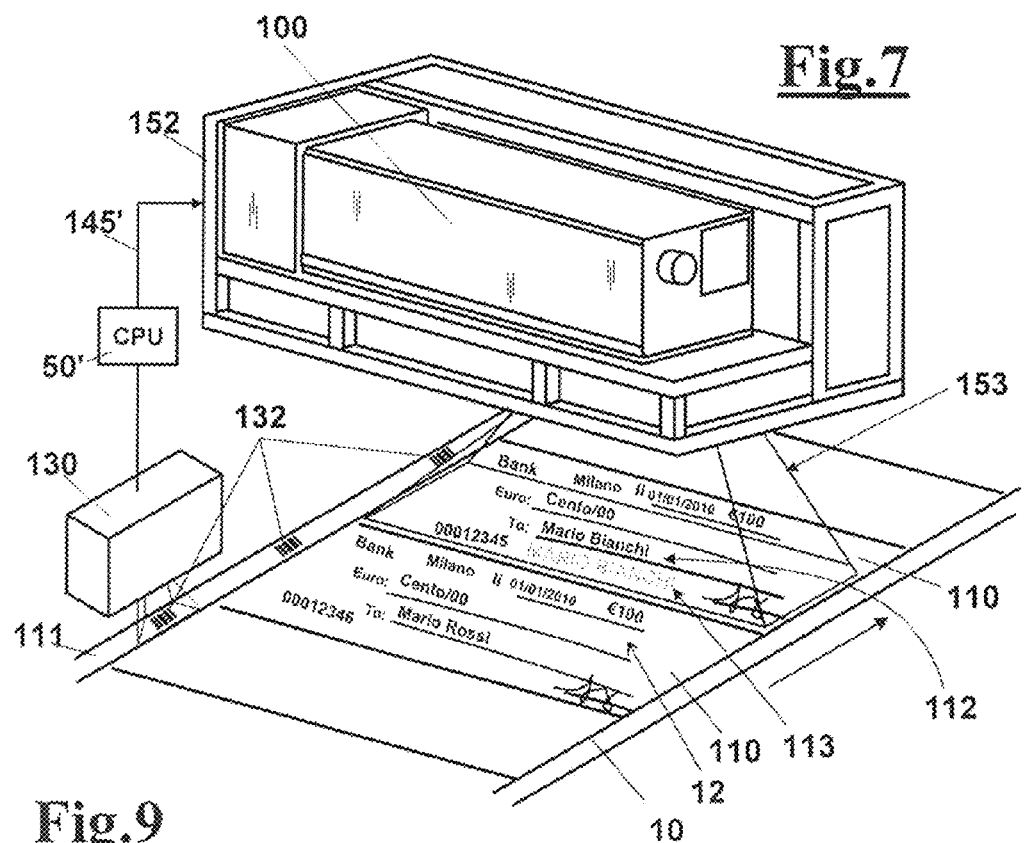
Fig.7
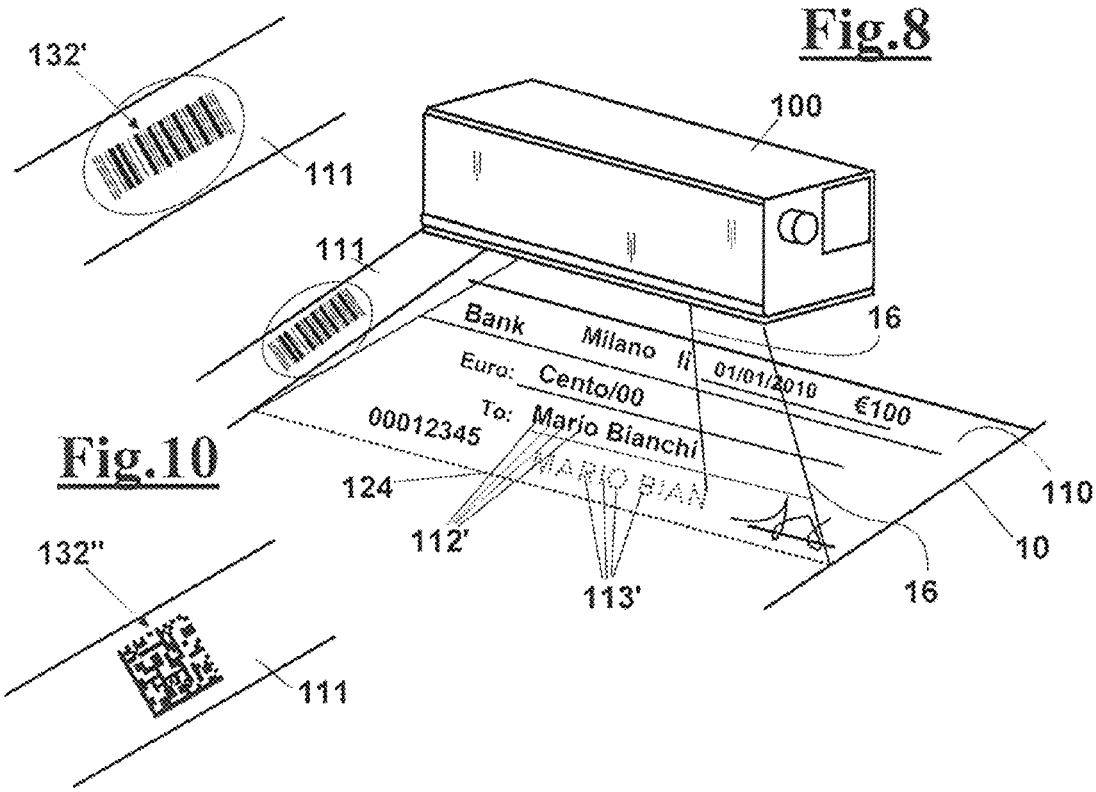
Fig.8
Fig.9
Fig.10 tecnica nota

METHOD AND AN APPARATUS FOR MAKING LASER ENGRAVURES ON A MOVING WEB

This application is a 371 of PCT/IB2013/053550, filed on May 3, 2013, which claims priority to Italian Application No. PI2012A000054, filed May 3, 2012.

The present invention relates to a method and to an apparatus for engraving a motif, i.e. a pattern, on a paper support, or the like, which moves at a high speed, by a laser beam that modifies or removes portions of material of the support.

In particular, the invention relates to a method and to an apparatus for creating the pattern on a piece of document printed on the support, more in particular, while or after printing the piece of document.

BACKGROUND OF THE INVENTION

Devices for creating patterns of various type on paper supports, or the like, for many purposes are known. A common case are devices for creating perforation lines that serves as tear-off lines dividing a printed form starting from adjacent forms, in a continuous printing process or operation, or as tear-off lines of a same document, in order to separate document portions that have different destinations.

The perforations are made mechanically, for example by an apparatus as described in ITPI2008A000075. However, this technique has some drawbacks. In particular, tear lines with a limited number of shapes can be created. Furthermore, cut or perforation blades must be sharpened often.

Methods are also known for creating pattern on paper material or the like by projecting a laser beam on it. By these methods, even complicated engravings can be created such as drawings or lacework, but the precision is acceptable only if the support is still or substantially still while it is engraved. In the case of targets like isolated three-dimensional bodies, or fabric or sheets of planar material, the target must be arranged in a working area, and then a laser engraving head is operated, like a movable head, for instance a two or more axes robot head, or a fixed head, which can comprise galvanometer-based lenses and mirrors.

In the case of laser machines for engraving on a web of paper or plastics, the web must be stopped when perforation lines or patterns are engraved, and must be started again once the engraving has been performed.

It is also possible to carry out laser engravings on a slow-moving leather or fabric web. In this case, amounts of material are removed by directing laser pulses along a line transversal to the web, with a slight inclination, in order to take into account the web conveying speed, even if this is very slow.

With reference to laser engraving systems that are configured for orienting a laser beam by means of galvanometers that actuate oscillating mirrors, an example is disclosed in WO9847035. These systems can be used for creating any engravings, in particular they are well-suited for engraving inscriptions and numbers.

These systems are suitable for engraving complicated pattern on a still support at a high speed. However, due to the speed at which the galvanometer-operated mirrors and lenses are moved, it is particularly difficult to accurately reproduce the intersection of graphic elements that meet forming sharp angles. For instance, this is the case of most types of the commonly used fonts. Due to the high speed of the support, beveled or irregular vertices, i.e. connections between the graphic elements, are formed instead of the sharp angles. This may lead to unacceptable distortions that affect an optical reading of the engraved patters, in particular alphanumeric symbols and other graphic symbols.

Another problem of the known art for creating patterns on supports or webs of paper, as well as of other materials, the choice of the power that the laser system supplies to the support is critical. In particular, the use of the laser for marking documents involves a risk of burning the support. For this reason, an accurate control of the power of the laser engraving beam is required. Since the laser emitter is excited, the power has a transient behavior, with the consequence that the shorter the laser emission of a single engraving event, the stronger the effect of the transient behavior that negatively affects the engraving quality. More in detail, the inner working temperature of the emitter is reached by the laser in a time that depends upon the power that the emitter is expected to provide. The lower the power used by a particular engraving process, the longer the influence that transient period will have. In particular, if pluralities of single holes or engravings have to be made in a quick succession, each laser emission must provide the power that is strictly necessary for making that engraving, and then stop abruptly the emission. For instance, in the case of a half cut (i.e. a "kiss-cut"), a slightly exceeding power may cause a perforation of the support. In alternative, in the case of a through hole, the variation of the emitted power with time, for a given required power, may be detrimental due to unstable performances in case of alternation of the cut and kiss-cut operations, which would lead to an unpredictable result which can be different from what is expected.

Moreover, most systems for writing printed authenticity characters, or other authenticity signs, could be easily imitated by ill-intentioned persons. Therefore, it is desirable to mark the objects with authenticity signs that are difficult to imitate.

SUMMARY OF THE INVENTION

Therefore, it is an object of the present invention to provide a method and an apparatus for engraving a predetermined pattern by laser beams on a support, e.g. a web of paper or similar material, moving at a high speed, in particular during a process of sequentially printing documents.

It is a particular object of the invention to provide a method and an auxiliary apparatus of a continuous printer device for marking printed documents, in order to ensure the authenticity of the data shown as printed types on the documents, i.e. in order to check them against data tampering and falsification.

It is another object of the invention to provide a method and an apparatus for engraving patterns on a paper support, or the like, by laser beams, which makes it possible to obtain engravings of a given quality even if the laser emitter conditions change, and therefore an engraving quality uniform on the substrate upon a temperature change of the laser emitter, in particular during the initial transient of an engraving work. In particular, it is an object of the invention to provide a method and an apparatus for engraving a pattern that prevents the support or the web from being damaged during the engraving operation.

It is a particular object of the invention to provide such method and apparatus that allow reproducing on the support, in particular on a rapidly advancing web, graphic elements or "strokes" that form sharp angles in the predetermined pattern, in order to obtain a desired connection of the strokes as reproduced, in particular in order to reproduce most accurately the intersection of the two graphic elements with respect to prior art methods and devices, for instance without forming a beveled or undesirably and/or irregularly rounded connection zone at the intersection.

It is another object of the invention to provide such method and apparatus that allow reproducing patterns on a paper support or the like, in such a way that the reproduced patterns are more difficult to be imitated and falsified with respect to the prior art.

These and other objects are achieved by a method for making laser engravings on a paper substrate, comprising the steps of:

defining a working area;

prearranging a laser pulse emitter for emitting laser pulses which have a power that is set to form engravings on the substrate in said working area;

prearranging a movable pointing means that comprises a reflection means and a focus means, said movable pointing means configured for sending the laser pulses to said working area;

selecting an engraving pattern, comprising a plurality of points to be engraved on the substrate by the laser pulses emitted as pulse packets in quick succession;

calculating an instruction file containing pointing instructions for operating the movable pointing means in such a way that a predetermined position of the movable pointing means corresponds to each pulse packet, a predetermined position of the points on the working area corresponding to said predetermined position of the movable pointing means;

selecting an emission power of the laser pulse emitter;

emitting laser pulses at the emission power through the emitter;

operating the movable pointing means according to the instruction file, so that the movable pointing means sequentially reaches each predetermined position by continuously changing the direction of the laser pulses in the working area and reproducing the pattern on the substrate.

In a first aspect of the invention, the paper substrate is a paper web;

a step is provided of prearranging a paper web conveying means configured for conveying the web along a predetermined direction, so that the working area is located along a path of the paper web;

the engraving pattern is associated with a first function that defines the position of the points to be engraved in the working area with respect to a first reference system that is integral to the web, and the main feature of the method is that:

the step of calculating an instruction file comprises calculating a transform of the first function from the reference system that is integral to the web into a second reference system integral to the emitter, wherein a second transformed function is obtained that is defined in the working area, and the instructions of the instruction file operate the pointing means in such a way that the laser pulses describe the transformed function with respect to the second reference system in the working area, such that the packets of laser pulses reach the web, and engrave the pattern on the web as if the web were motionless.

In other words, in the method according to the invention, the movable reflection means is operated by means of an instruction file, in order to describe, in a fixed reference system, a virtual pattern, i.e. a transformed pattern which corresponds, on the moving web, to the predetermined pattern. This way, the laser pulses "track" the moving web, as it is required to provide the engraving according to the predetermined pattern, taking into account the movement of the web.

The virtual pattern, i.e. the transformed pattern is normally a copy of the predetermined pattern that is compressed according to the feeding direction. In particular, it is possible to engrave visible patterns, which may comprise types, inscriptions, numbers or marking codes, that have been previously printed on a web, or that are printed while the engraving process is being carried out, upstream of the working area, in order to clearly associate engraved zones to the printed zones of the web, for instance, engraved zones containing the same or corresponding engraved types, inscriptions, numbers or codes etc.

With the method according to the invention, this step of associating an engraved zone to a simultaneously visible printed zone can be carried out without reducing the printing speed, i.e. the speed of the paper during printing, which in today printers can exceed 200 m/min, and is normally selected between 130 and 150 m/min. In particular, the method according to the invention makes it possible to engrave authentication codes or inscriptions of documents such as cheques, payment and identity documents, contracts, invoices, etc., in order to prevent their falsification, without reducing the printing speed of the documents, since the engraving can be made at the same speed as the print without stopping or slowing down the advancing web.

Advantageously, the method comprises steps of:

learning position data of a point of the web with respect to the reference system that is integral to the laser pulse emitter;

computing a conveying speed of the web;

preferably, computing a conveying acceleration the web.

For instance, the speed, and preferably the acceleration of the web, is calculated as the average values of two consecutively read data position values, which are read at regular intervals, i.e. in predetermined reading windows. Once the position, the speed and preferably the acceleration of a point of the web has been learnt, by a calculation or as an input data, in the time, a vectorial displacement sum is calculated in order to move the laser pulse beam to subsequent positions, which makes it possible to engrave the predetermined pattern on the web and to take into account the movement of the paper.

In particular, the reading interval is set between 1 millisecond and 10 milliseconds. The movable reading window is necessary for calculating average values of the speed and of the acceleration on short time intervals, so that the average values can be considered substantially instantaneous values, apart from an acceptable calculation error.

Preferably, the step of learning position data is carried out by counting pulses coming from an encoder associated with the paper web conveying means, comprising for example advancement cylinders. In an alternative embodiment, the step of learning position data is carried out by reading the speed of marks previously made on the paper web, when the marks passes proximate to two fixed reading points.

Advantageously, the step of prearranging reflection means comprises a step of prearranging galvanometers as actuators of the reflection means. The galvanometer interpolation control system, starting from vectorial or raster data to be acquired, in particular by reading the in-phase and quadrature signals produced by an encoder integral to the means for moving the web, allows learning and taking into account, and therefore accurately compensating for the position, the speed and the acceleration of the web by a predictive estimation algorithm.

Advantageously, the transform of the first function from the reference system that is integral to the web into the second reference system that is integral to the emitter is defined by a tracking correlation, i.e. a tracking algorithm, comprising the speed. Preferably, the correlation also comprises the acceleration of the web. For example, the correlation is expressed by:

$$x''(t)=x'(t)-X_c(t)-v(t)*t \quad [1]$$

$$y''(t)=y'(t) \quad [2]$$

or by:

$$x''(t)=x'(t)-X_c(t)-v(t)*t-\tfrac{1}{2}a(t)t^2 \quad [3]$$

$$y''(t)=y'(t) \quad [4]$$

wherein:
x", y" are the coordinates of the true pointing position, i.e. the coordinates of an engraving point of the pattern with respect to the reference system that is integral to the laser pulse emitter;
x',y' are the coordinates of an engraving point of the pattern with respect to the reference system that is integral to the conveyed web;
$X_c$ is the position, according to an advancement coordinate of the paper;
v, a are respectively the speed and the conveying acceleration of the web with respect to the reference system that is integral to the laser pulse emitter.

In an advantageous exemplary embodiment, the method also comprises steps of:
printing the pattern, in particular a piece of document, on the web, thus obtaining a printed pattern;
reading at least one portion of the pattern printed on the web;
wherein the step of selecting an engraving pattern comprises a step of selecting the at least one portion of the printed pattern, and the instruction file comprises instructions for engraving the pattern at a position on the web corresponding to the printed pattern, in particular at a predetermined distance from the printed pattern, such that an one-to-one correspondence is obtained on the piece of document between the engraving area, which reproduces the data field, and the same data field as shown on the piece of document.

In particular, the reading step comprises a step of scanning and optically recognizing types of the pattern printed on the web.

In particular, the engraving step provides the reproduction of the types of the data field by removing an amount of material without perforating the piece of document, by a plurality of local abrasions on the web.

In an advantageous exemplary embodiment, the method also comprises the steps of:
printing a predetermined activation or control code on the web;
reading and optically recognizing the activation or control code from the web upstream of the working area;
wherein the step of calculating the instruction file comprises the generation of an instruction of engraving the pattern at a predetermined position of the web responsive to the activation or control code, which has been read and optically recognized.

In accordance with a second aspect of the invention, the method for making laser engravings on a paper substrate comprises a step of:
prearranging the substrate in the working area, and
the main feature of the method is that the step of selecting an emission power comprises a step of defining a nominal emission power value and a plurality of increased emission power values higher than value of the nominal emission power, and the step of emitting laser pulses is carried out by selecting in turn the emission power values decreasing between a first increased emission power value and a last increased emission power value, lower than the first increased emission power value and, subsequently, said nominal emission power value wherein the decreasing increased emission power values are selected and used as emission power values such that, in a starting period of the step of emitting, the emitter emits a laser pulse at an emission power set between the nominal power and a value that approximates the nominal power and that differs from the nominal power within a predetermined value range. In particular, the approximating emission power is substantially the same as the nominal power.

In other words, during the power supply time, i.e. during a same pulse and, in particular, during the starting transient period of each pulse, the selected emitter power is reduced between the first value and the last increased power value, with respect to the nominal power, in order to compensate for the difference between the nominal power and the power that is really supplied during the transient period, maintaining the power really supplied by the pulses at a value that is the value closest to the predetermined power value, i.e. to the power value that the emitter would emit if the heating starting transient were not present. This way, the lack of power is provided for, with respect to the nominal power selected, which the emitter can provide during a step of increasing the nominal power, in particular during a transient heating step that takes place at the beginning of a step of emitting laser pulse and of engraving the substrate.

In particular, the emitter is operated according to a pulse-width modulation control signal in which a power emission duty-cycle is defined, and the plurality of increased power values is used for said nominal power through a step of changing said duty-cycle according to a working temperature of the laser emitter.

In accordance with a third aspect of the invention, the method for making laser engravings on a paper substrate comprises a step of prearranging the substrate in the working area, and the pattern comprises two graphic elements or "strokes", in particular two segments, which meet at a vertex forming a sharp angle. The main feature of the method is that the instruction file comprises first instructions for engraving first engraving points along the direction of the first segment and second instructions for engraving, after the first points, seconds engraving points along the direction of the second segment, and an instruction of adding a predetermined delay for prolonging a step of executing a first instructions, such that at least one engraving point is engraved having at a distance from the vertex responsive to the delay. This way, a connection of a desired shape can be obtained at the intersection point of the two graphic elements in the pattern as engraved on the substrate, in particular the sharp angle can be approximated. In particular, this is possible if the substrate is a rapidly advancing web, such as a web advancing at the printing speed of today's laser printers for continuous paper webs.

Preferably, a step is provided of correcting a trajectory in order to engrave a point of the second points at a predetermined position along the second segment.

Advantageously, in this case, the step of operating the reflection means comprises a step of locally increasing of the equivalent pass band of the system, in particular if reflection means are used that are provided with galvanometer actuators. By a wider pass band, less rounded connections can be obtained at the vertices formed by such graphic elements, due to the higher acceleration of the system. This allows a more accurate reproduction of sharp angles formed by adjacent graphic elements.

More in detail, the algorithm is based on the fact that the driver, the so-called DSP, which performs the step of operating the reflection means, knows in advance the trajectories that must actually be followed in order to accurately reproduce the sharp angle intersections between graphic elements. Therefore, the DSP driver can take the suitable countermeasures for modifying the instructions intended for the galvanometers, taking into account the future positions, which the galvanometer must execute but that, obviously, are not preliminarily known.

In a fourth aspect of the invention, the method for making laser engravings on a paper substrate comprises a step of prearranging the substrate in the working area, and
the pointing instructions of the instruction file comprise focus instructions for the focus means, wherein the focus means is operated in such a way that:
 beams of the pulses directed by the pointing means reach with an own focus a first plurality of points of the web in the working area, and
 the beams reach a second plurality of points of the working area with the focus at a predetermined distance from the working area and, therefore, the web.

This way, an intentional focus defect, i.e. an intentional blurring, can be created at a region of the working area comprising the second points, for example at a predetermined zone of a piece of document, which can provide a specific authenticity mark of the engraving and/or of the piece of document, i.e. which makes it possible to assess the authenticity of the piece of document and/or of the engraving.

In particular, the focus instructions are configured to operate the focus means:
 to take a same focusing position for directing the beams to the first plurality of points of the working area that have a same distance from a point of the working area arranged to be substantially perpendicularly attained by the beams starting from the pointing means;
 to take a position different from the focusing position for directing the beams to the second plurality of points of the working area.

BRIEF DESCRIPTION OF THE DRAWINGS

The invention will be now shown with the following description of exemplary embodiments, exemplifying but not limitative, with reference to the attached drawings in which:

FIG. 4 is a block diagram of the program means for operating, inter alia, the pointing means of the apparatus of FIGS. 1-3;

FIG. 5 diagrammatically shows a continuous print device that is provided with an apparatus for engraving a motif, i.e. a pattern, according to the invention;

FIG. 6 diagrammatically shows a perspective view of a printer apparatus comprising at least one reading head or scanner;

FIG. 7 diagrammatically shows a perspective view of an exemplary embodiment of the apparatus of FIG. 6, configured to read an activation or control code and to generate a corresponding engraving signal for the laser engraving print device;

FIG. 8 shows diagrammatically a detail of the apparatus of FIG. 7, where the operation of a laser beam it is shown while engraving an engraving zone of a document, for example a negotiable instrument, of a succession of printed documents printed on a same web;

FIGS. 9 and 10 diagrammatically show two possible types of activation/control codes printed on a side portion of the advancing web;

DESCRIPTION OF PREFERRED EXEMPLARY EMBODIMENTS

Figure 1:
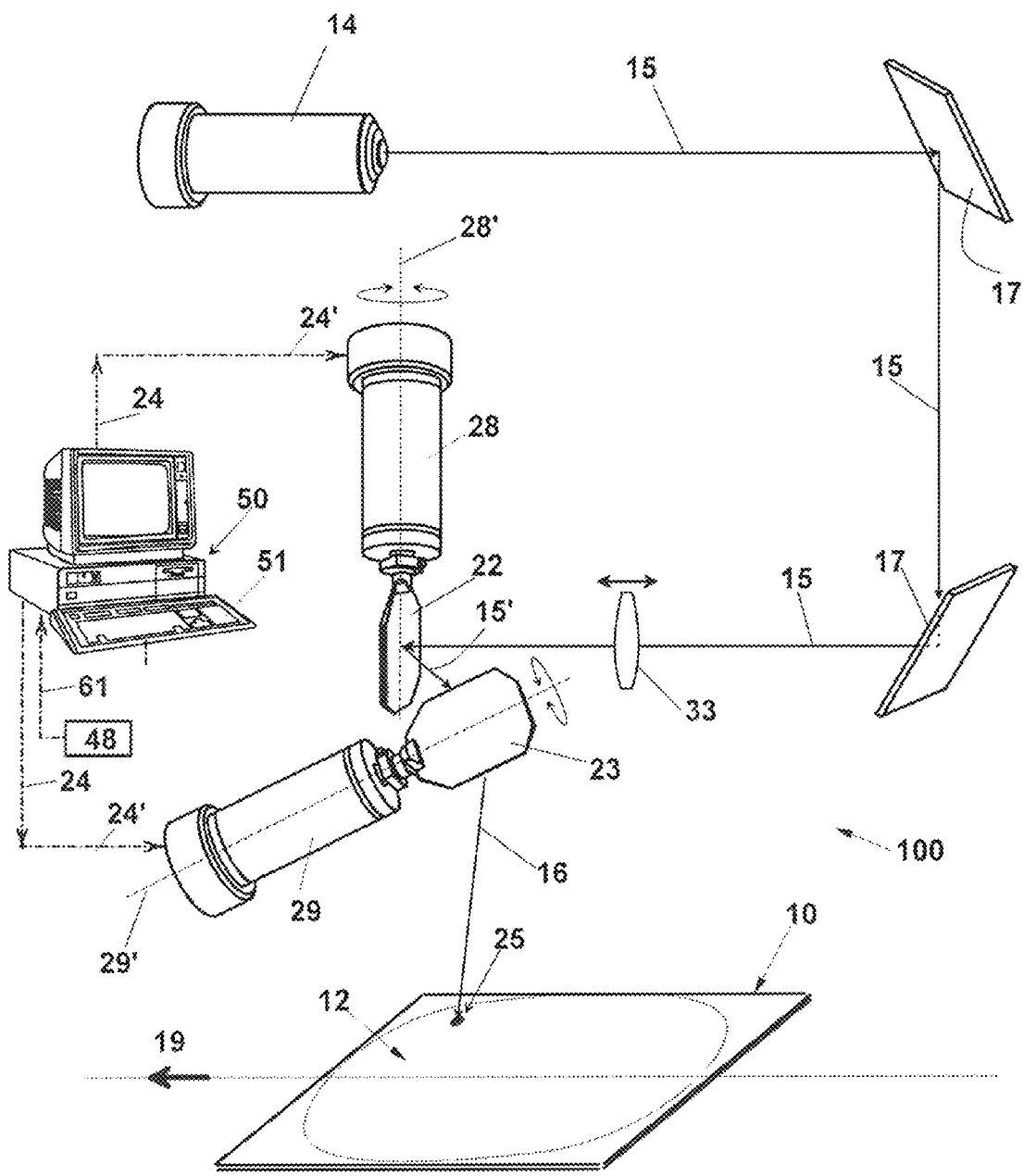
FIGS. 1-3 show diagrams of an apparatus for engraving or creating a motif, i.e. a pattern, on a moving paper support, or the like, at three different operation steps.
Figure 2:
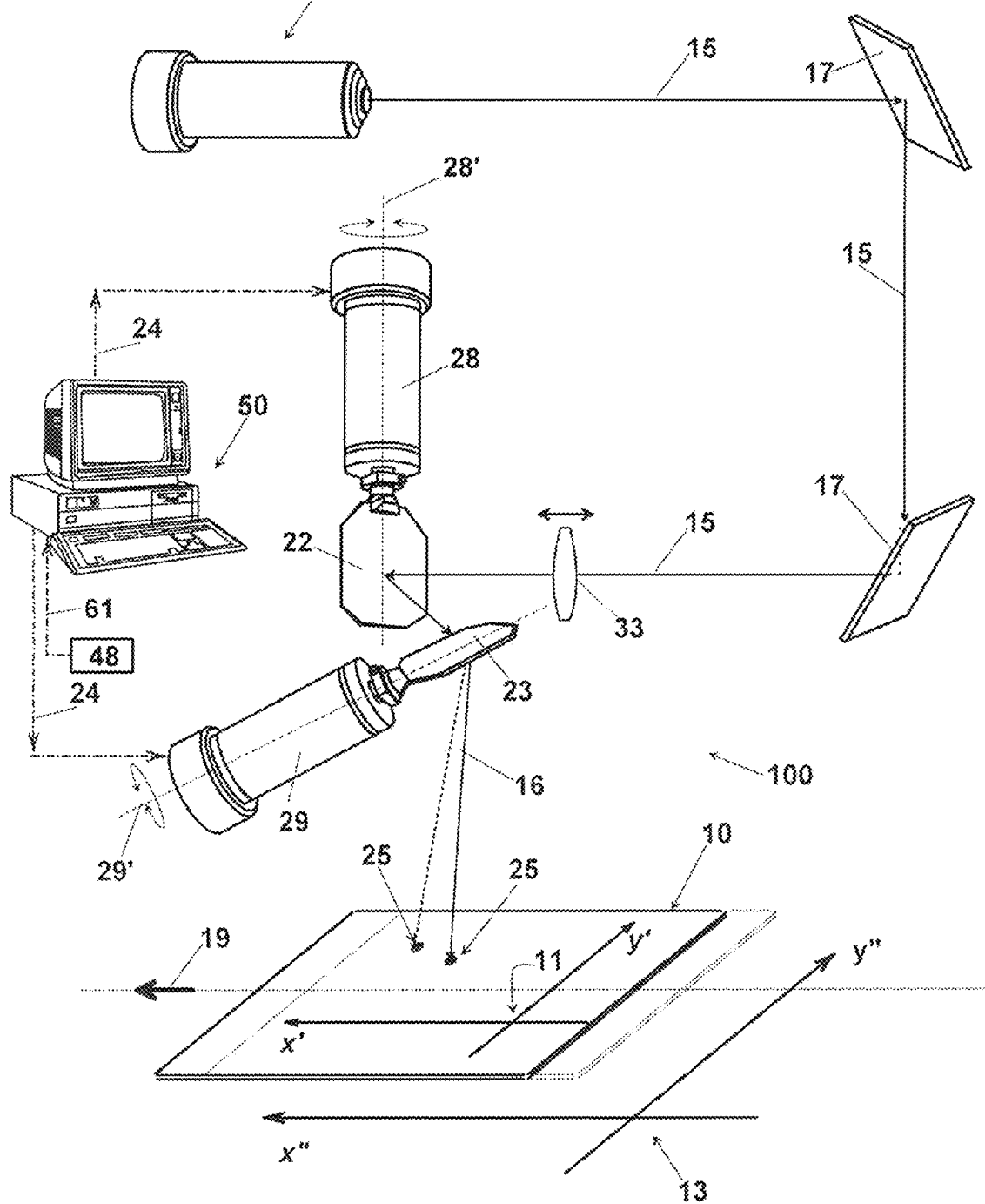
Figure 3:
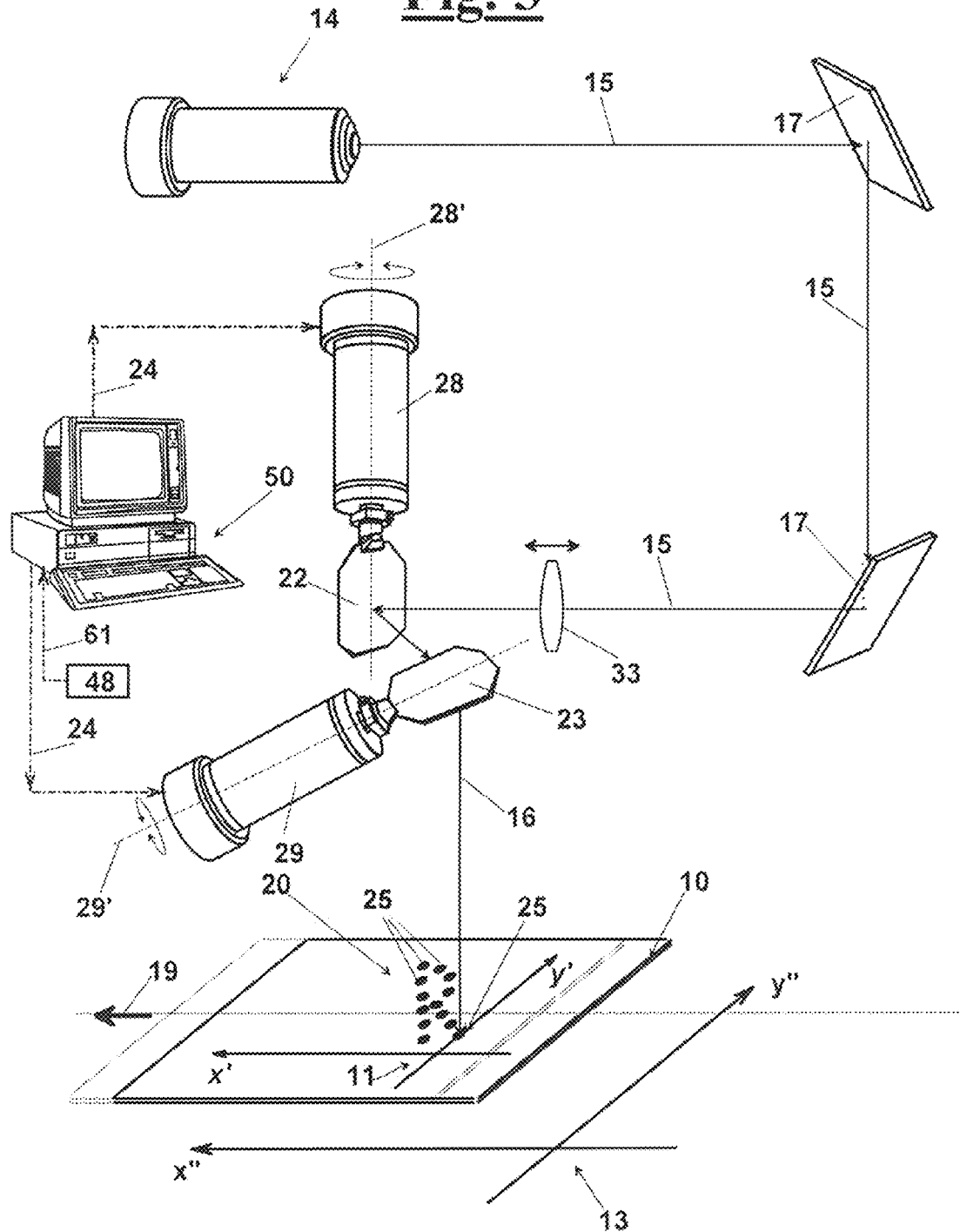

With reference to FIGS. 1-3, a laser engraving head 100 is described, according to the invention, for making laser engravings on a web 10 of paper, or of another material, while web 10 is conveyed according to a predetermined conveying direction 19 in a working area 12, on which it can slide without friction. Web 10 is conveyed by a dedicated conveying system, as diagrammatically shown, for instance, in FIGS. 5 and 6.

Laser engraving head 100 comprises an emitter or laser "gun" 14 of known type that is configured for emitting a laser pulse beam 15,16 with a power suitable for making engravings on web 10.

The material of the web is preferably a paper material, but it may also be a natural or artificial polymeric material such as a fabric, a metal material, or another material.

By the expression "engravings" local modifications of web 10 are intended that are made by a supply of laser energy that moving web 10 receives from laser beam 16. This supply of energy firstly causes a local heating of web 10, which can lead to a local burn or evaporation of the material of web 10. As a consequence of this local burn, a local loss of material occurs at points 25 where laser beam 16 reaches web 10. The loss of material may occur in the whole thickness of the material, such that at the engraved points a through hole is made. In alternative, the loss of material may only partially affect the thickness, such that more or less deep surface cavities are formed. These two operation modes are called "cut" and "kiss-cut", respectively. Furthermore, at points where beam 16 engraves the surface of the web, it is possible to cause surface modifications that can be optically perceived, for example local color modifications.

Laser engraving head 100 further comprises a movable reflection means or mirrors 22,23, i.e. a reflection means that is configured for changing its own orientation in the space, in order to reflect a laser beam 15,15' that hits them, thus forming a reflected beam 15',16 that has a direction depending upon the orientation of mirrors 22,23. In particular, mirrors 22,23 can rotate about respective rotation axes 28',29' by respective rotary actuators 28,29. Preferably, rotary actuators 28,29 comprise galvanometers, which, as known, are widely used in mirror systems for directing laser beams, and which allow controlling the orientation of mirrors 22,23, by suitable current signals.

In particular, FIGS. 1 and 2 refer to two different configurations of laser engraving head 100 in which movable mirrors 23,24 are oriented so that beam 16 reaches respective distinct points 25 of working area 12. For instance, the depicted configurations may relate to successive instants in a process of engraving a pattern 20 that comprises points 25 engraved on web 10, as shown in FIG. 3.

Laser engraving head 100 also comprises a focus means 33, for focusing, i.e. for converging beam 16 to a predetermined point, i.e. the focus, which is located on the line along which the trajectory of the laser beams propagates, as shown in particular, in FIGS. 1-3, upstream of movable reflection means 22,23. In fact, as diagrammatically shown in FIG. 5, the galvanometer-based scanning system of this embodiment is a polar system, where the distance h between pointing means 22,23 and points 25 of working area 12 can be adjusted. The focus means may have the known form of a lens 33 that is arranged for translating along an own axis, in order to compensate in turn adjustable distance h, i.e. in such a way that the focus falls on web 10, i.e. coincides with a point 25, in a normal engraving operation.

By suitably arranging rotation axes 28',29', as well known in the art, output laser beam 16 can be directed in such a way that the focus is moves along a plane. If working area 12, along which slides web 10, is arranged according to this plane, the focus of laser beam 16 can reach any point 25 of working area 12.

Laser engraving head 100 also comprises further reflection means or fixed mirrors 17. The position and the orientation of fixed mirrors 17 depend upon the position of emitter 14 with respect to movable mirrors 22,23. Typically, the focus means is located between fixed mirrors 17 and movable mirrors 22,23.

With reference now also to FIG. 4, in order to control actuators 28,29, i.e. to modify the orientation of movable mirrors 22,23, a program means 50 is provided that is configured for receiving an engraving control signal 30 through conventional input means 51, such as a keyboard, through which an operator can order to make a given pattern 20 on advancing web 10.

Pattern 20 is a set of graphic elements that may form, for instance, a type as shown in FIG. 3, or a succession of types, or an unnecessarily alphanumerical symbol, or a drawing, which may also have different clear/dark tonalities.

In program means 50 a calculation means 52 is provided that, starting from engraving control signal 30, i.e. from pattern 20 selected by the user, is configured for producing a work programme in the form of a function 31, by which an effect such as a perforation or a surface modification of web 10 is associated to each point of working area 12. Such a function 31 is therefore defined in the working area 12 and represents pattern 20 in a reference system 11 integral to web 10. For instance, as shown in FIG. 2, reference system 11 may comprise two axes x',y', where axis x' is oriented according to conveying direction 19 of web 10. Further computing means 53 (FIG. 4) of program means 50 are configured for producing, starting from function 31, an instruction file 24 that contains pointing instructions for operating pointing means 22,23,33, i.e. movable reflection means 22,23 and/or focus means 33. The pointing instructions of file 24 are interpreted by an interface 54 that changes them into a plurality or a succession of electric signals 24' that are intended, in particular, for rotary actuators 28,29, in order to adjust the orientation of reflection means 22,23 in the time, and that also contain focus instructions for adjusting the position of focus means 33 in the time, so that the latter reflects laser pulses 15,16 to working area 12 and reproduces pattern 20 on web 10.

File 24, according to the prior art, is formulated as a sequence of instructions for carrying out a pattern 20, which define the order according to which the single points of pattern 20 are reproduced.

To take into account that pattern 20 is reproduced at least in part, while web 10 advances, a means 51,55 is provided associated/belonging to program means 50, for learning or calculating a speed data 61 of web 10 while the latter crosses working area 12. For instance, this may occur through a conventional input means such as keyboard 51. The smaller the change of speed 61 once data speed 61 has been learnt or calculated, the more accurate the reproduction of the pattern.

In alternative, a web speed detection means can be provided of a type known to a skilled person. For instance, a means 48 can be provided for measuring the position of the web, which comprises an encoder associated with the means for advancing, as diagrammatically shown in FIGS. 5 and 6 along with a drag and print unit 86, which may comprise dragging cylinders 87 for web 10. Encoder 48 is configured for emitting pulses that are received by program means 50 and transferred to computing means 55 which counts them and compute substantially real-time a plot of the speed of web 10 against time, as a succession of average speed values.

In an exemplary embodiment, speed computing means 55 is also configured for calculating the acceleration of web 10. For instance, the speed and preferably the acceleration of the web may be calculated as average values of two consecutively read data position values, which are read at regular intervals, i.e. in predetermined reading windows of predetermined amplitude, for example, of amplitude set between 1 millisecond and 10 milliseconds, so that the average values can be considered substantially instantaneous values.

Still in order to take into account the movement of the web during the reproduction of pattern 20, program means 50 of laser engraving head 100 comprises (FIG. 4), in accordance with the first aspect of the invention, a computing means 56 for calculating, starting from function 31 and from speed data 61, and possibly from the acceleration data, a transformed function 32 which is also defined in working area 12, and which describes pattern 20 with respect to a fixed reference system 13 (FIGS. 2, 3), i.e. integral to laser emitter 14. For instance, as shown in FIG. 2, reference system 11 may comprise two axes x", y", where axis x" is oriented like conveying direction 19 of web 10. Still according to the invention, computing means 53 produces instruction file 24 starting from transformed function 32. In other words, reflection means 22,23 (FIGS. 1-3) is operated in such a way that laser pulses 16 describe a transformed pattern in working area 12 on web 10, which corresponds to predetermined pattern 20, with respect to reference system 13 integral to laser emitter 14.

In an exemplary embodiment, computing means 56 (FIG. 4) is configured for calculating transformed function 32 of function 31, by a tracking correlation, i.e. a tracking algorithm, that takes into account speed v and acceleration a of web 10. For instance, the tracking correlation may have the form:

$$x''(t)=x'(t)-X_c(t)-v(t)*t-\tfrac{1}{2}a(t)t^2 \quad [3]$$

$$y''(t)=y'(t) \quad [4]$$

where $X_c$ indicates the position, according to an advancement coordinate of web 10.

Emitter 14 of laser pulses (FIGS. 1-3) is associated with a means for predetermining the power of emitted beam 15. The means for predetermining the power, not shown, may be a part of program means 50 of the apparatus.

With reference to FIGS. 5-10, a method is described, according to an exemplary embodiment of the invention, for certifying documents that are printed by a high-speed print unit. By the expression "high-speed" it is meant, typically, a speed higher than 10 m/min, in particular a speed between 10 m/min and 200 m/min, more in particular, a speed between 100 m/min and 150 m/min. In this case, the laser engraving means comprises at least one laser head 100, of the type shown in FIGS. 1-4, which is arranged above web 10 and is configured for generating at least one beam 16, in a predetermined working area 12.

In particular, FIG. 7 shows an apparatus according to an exemplary embodiment of the invention for making laser engravings on a advancing web 10, comprising a reading head 130 and a laser engraving head 100 configured for being arranged in a continuous printing line for treating/creating a documents 110 in sequence along a web 10. For instance, documents 110 may be negotiable instruments, insurance documents, transit documents, waybills, and the like.

The apparatus may be configured for causing reading head 130 to scan the data contained in a visibly printed data field 112 of each document 110, to recognize optically types or other symbols written in data field 112, and may be configured for subsequently causing laser engraving head 100 to engrave types 113' in an engraving field 113, said types corresponding to printed types 112' of printed data field 112.

Besides being configured for substantially reproducing data field 112 in engraving field 113 by removing an amount of material, laser engraving head 100 is also configured for making cut engravings, as shown in FIG. 8, by which tear-off lines 124 are obtained for separating documents 110 from one another, in a continuous process of printing and engraving or of engraving only.

Still with reference to FIGS. 7 and 8, the continuous printing means 86 (FIG. 6) is configured for printing a predetermined activation or control code 132 of piece of document 110, as shown in detail in FIGS. 9 and 10, and reading head 130 is configured for reading activation or control code 132 printed on piece of document 110 by printing means 86.

In particular, activation or control code 132 may be printed on a web or piece of document side portion 111 that can be removed from the rest of the piece of document, typically at the end of the operation.

Furthermore, the apparatus comprises a program means 50' configured to generate a perforation signal 145' upon reading activation or control code 132. Finally, laser engraving head 100 is configured for engraving a text on piece of document 110, according perforation signal 145'.

As described above, laser engraving head 100 is arranged to create an engraving field 113 that reproduces printed data field 112, responsive to activation or control code 132, and/or makes it possible to make a tear-off line 124 between each document 110 and an adjacent piece of document 110. More in detail, activation or control code 132 is an optical code selected between a bar code 132' (FIG. 9), a data matrix 132'' (FIG. 10) or an optical code of any type.

In particular, optical codes 132 can contain data for reproducing data field 112 by laser engraving head 100, and/or data for making tear-off lines 124 on web 10 or also clean cuts for immediately separating each of the several documents from one another. This way, the laser engraving based on activation or control code 132 makes it possible to obtain, for each type of piece of document 110, a dedicated reproduction of data field 112, or a dedicated configuration of the tear-off lines. In other words, by using activation/control codes 132, makes it possible to carry out different operations on each document 110 on a same printing line.

While making, i.e. engraving a point 25 of the pattern on a substrate paper 10, for example an advancing web 10, emitter 14 is operated according to a pulse-width modulation or PWM control signal, in which a duty-cycle is selected between a minimum value and a maximum value in a time window of about some seconds, in which trains of pulses follow one another, and each pulse has a prefixed shape, at a frequency of 20/30 kHz.

Figure 11:
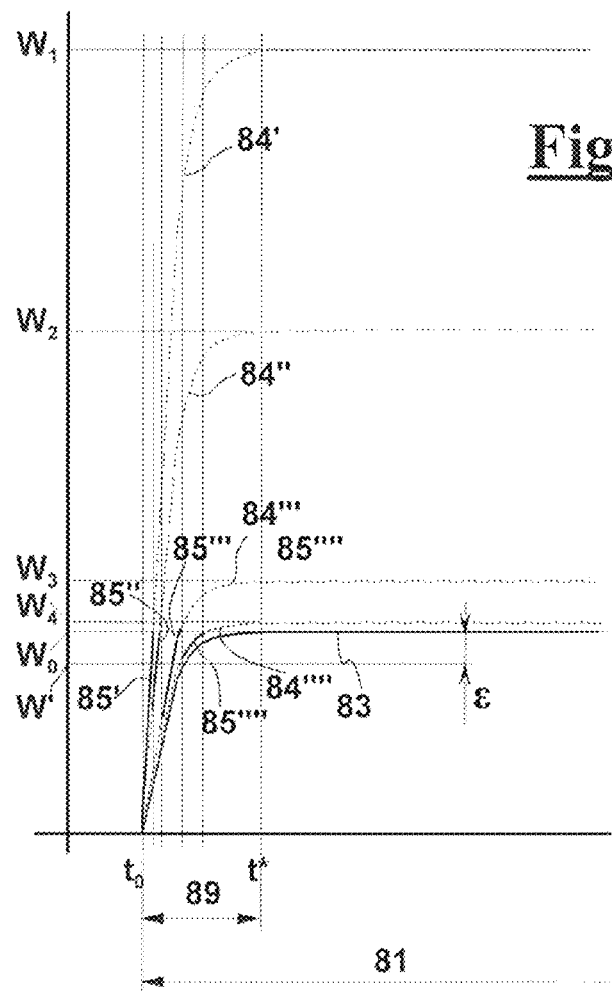
FIG. 11 is a diagram that diagrammatically shows a correction procedure of the power supplied during an engraving operation, in particular during a heating transient period of a laser emitter.

However, as indicated in FIG. 11, the power W 83 actually supplied by emitter 14 in a power supply step 81 is different from the selected nominal power $W_0$ corresponding to an ideal energy input. In fact, the instantaneous power W that is supplied by an emitter configured for emitting a nominal power $W_0$ does not immediately achieve nominal value $W_0$. On the contrary, power W has a transient period 89 that corresponds to a heating step of emitter 14, during which the instantaneous value of power W' is lower than predetermined nominal value $W_0$. In FIG. 11 is shown a typical trend 83 of the power supplied by laser source during transient period 89, i.e. before laser emitter 14 reaches a prefixed steady temperature. The inner working temperature is attained by laser emitter 14 in time that depends upon the power that laser emitter 14 must emit. The lower the power used in a specific operation, the longer the Transient period 89 will be.

This trend of instantaneously supplied power, under a same power set point $W_0$, can lead to both cut and kiss-cut uneven performances and, therefore, it can worsen the overall quality of an engraving on a given substrate.

In accordance with the second aspect of the invention, in order to compensate for the difference between nominal power $W_0$ and instantaneous power W that occurs during heating transient period 89, a step is provided of temporary increasing the nominal power with respect to predetermined nominal value $W_0$, and this is done preferably through decreasing values. In particular, the step of temporary increasing the power comprises a step of selecting a plurality of increased emission power values $W_1$, $W_2$, $W_3$, $W_4$, here listed in the decreasing order, that are higher than nominal emission power $W_0$, and the step of emitting is carried out by setting these increased power values as nominal values, in the same order as they are listed. The increased emission power values $W_1$, $W_2$, $W_3$, $W_4$, which correspond to the trend of actually emitted power 84',84",84'",84"", are selected in such a way that, in a initial period of the step of emitting, emitter 14 emits laser pulses at a power acceptably close to nominal power $W_0$. The curve of generated power W coincide, starting from time $t_0$ at which power begins to be supplied, with the curves of delivered power 85',85",85'", 85"" which correspond to power $W_1$, $W_2$, $W_3$, $W_4$, respectively, until with power 83 is obtained a power value that is close enough to predetermined nominal power $W_0$. In other words, increased emission power values $W_1$, $W_2$, $W_3$, $W_4$ are selected in such a way that, in an initial period of the step of emitting, emitter 14 emits a laser pulse 15 at an emission power set between nominal power $W_0$ and a value W that approximates the nominal power and that differs from nominal power within a predetermined range $\epsilon$.

In particular, program means 50 (FIG. 1) is configured for acquiring the selected power and for acquiring the working temperature within emitter 14, and is enabled for establishing whether the steady temperature has been reached, by integrating the power itself and by comparing it with the characteristic curve of power against temperature of emitter 14, which is known from the testing or from nominal data of emitter 14. Moreover, program means 50 is configured for adjusting the duty-cycle, in order to provide the emission power program described above with reference to FIG. 11.

Figure 12:
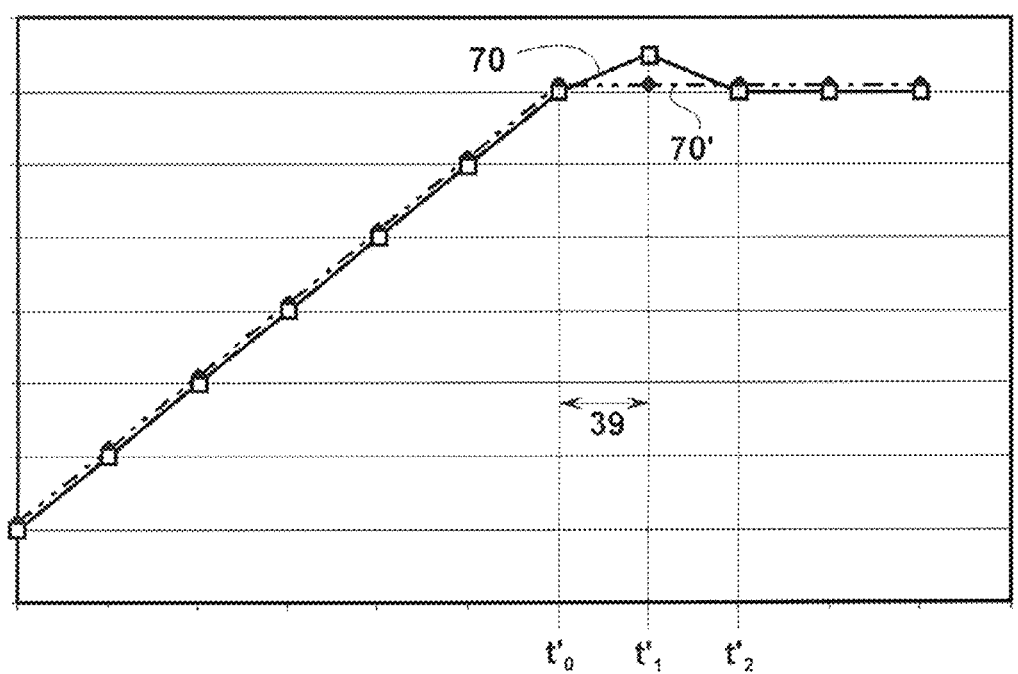
FIGS. 12-14 diagrammatically show the correction of the engraving trajectory for engraving vertex points, in particular FIG. 12 diagrammatically shows a step of adding a predetermined delay for prolonging the step of engraving points along the direction of the first segment.
Figure 13:
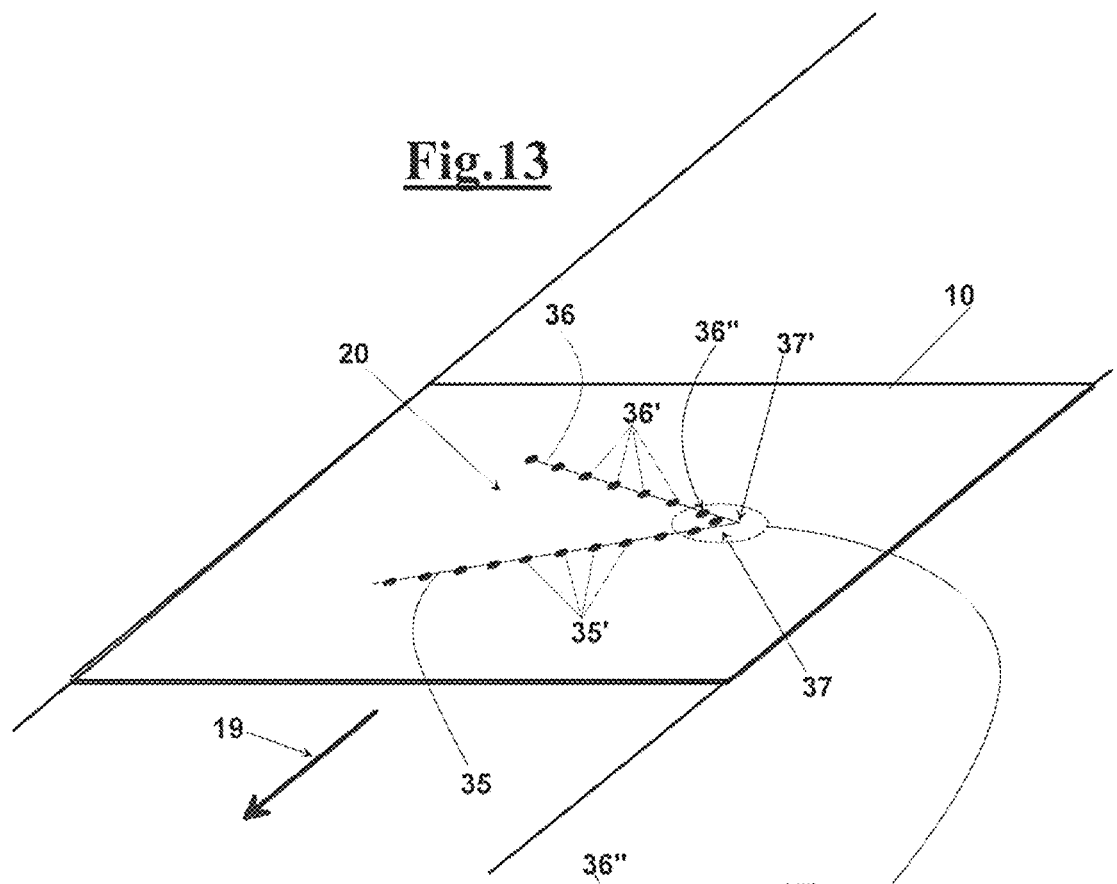
Figure 14:
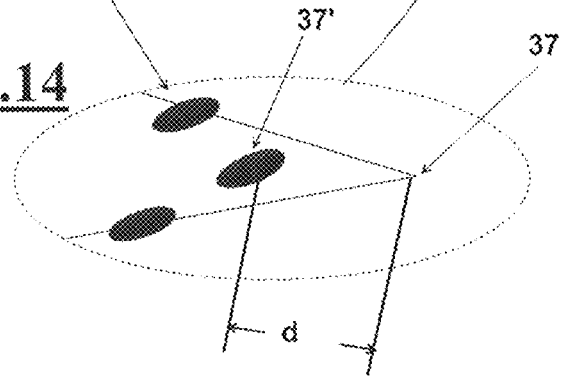

As shown in FIGS. 13 and 14, pattern 20 may comprise two graphic elements 35,36, for instance two line segments 35,36 of a type such as "V", which meet at a vertex 37 forming a sharp, i.e. not rounded, angle. In accordance with the third aspect of the invention, instruction file 24 comprises in this case pointing instructions for engraving first engraving points 35' along the direction of a first segment 35 and pointing instructions for engraving, after points 35' of first segment 35, seconds engraving points 36',36" along the direction of second segment 36. Furthermore, as shown in FIG. 12, instruction file 24 comprises an instruction of adding a predetermined delay 39 for prolonging the step of engraving points 35', corresponding to the line 70 of the diagram, along the direction of first segment 35, in order to engrave at least one engraving point 37', as shown in FIG. 14, which has a predetermined distance d from vertex 37. Distance d depends upon delay 39 at which the pointing means is operated. Moreover a step is provided of correcting a trajectory in order to engrave a point 36" of second points 36',36" at a predetermined position along second segment 36.

In accordance with the fourth aspect of the invention, the pointing instructions of instruction file 24 comprise focus instructions for controlling focus means 33 so that laser pulse beam 16, which is orientated by pointing means 22,23,33, do not reach the whole working area 12 with its own focus on paper substrate 10, in particular on advancing web 10, but in such a way that in some points of working area 12, which preferably belong to a region 65 of working area 12 (FIG. 13), the focus is at a predetermined distance from substrate or web 10.

Figure 15:
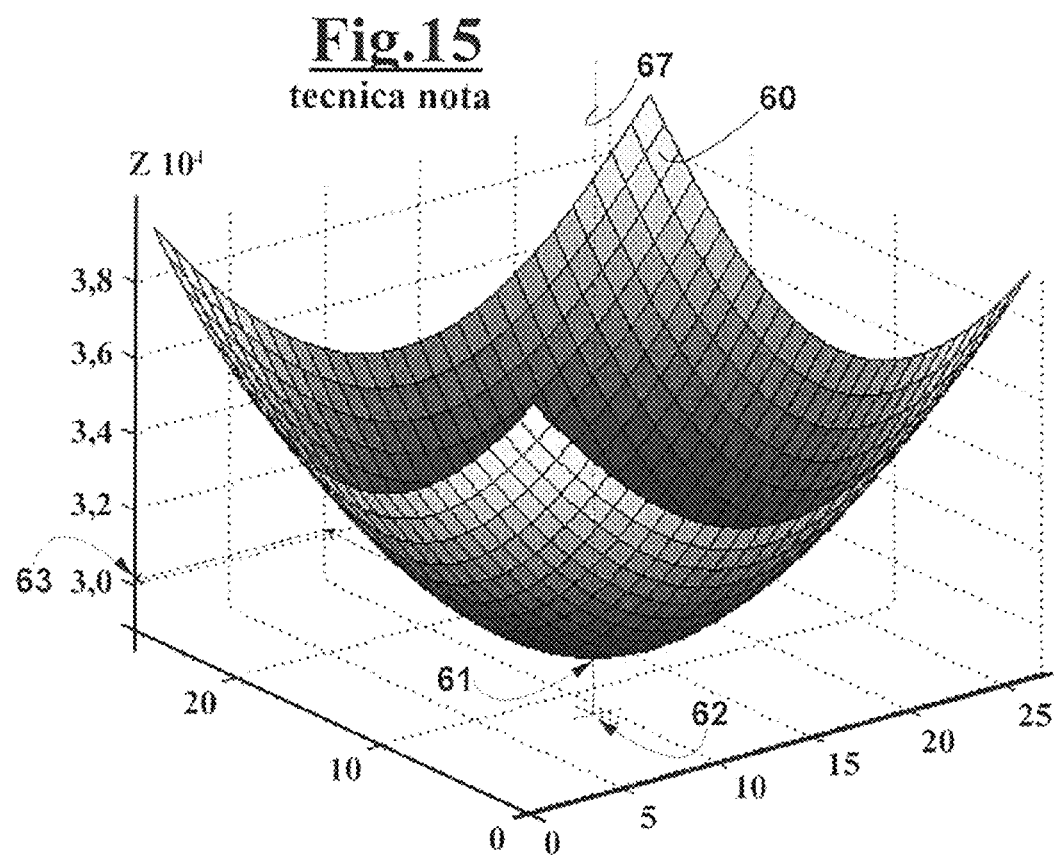
FIG. 15 shows the characteristic surface of the focus means of to the prior art, i.e. a diagram of the position of the focus with respect to the moving web in the working area of the apparatus, in the case of a ideal focusing at each point of the working area.

In the prior art, as shown in FIG. 15, focus means 33 is configured for being arranged at a position 63 when laser beam 16 hits working area 12 at a point 62 that can be reached by a beam 16 oriented perpendicularly to work area 12, and to be arranged in the same position when the radius hits working area 12 in all the points that have a same distance from point 62. This position can be represented as a coordinate of a solid surface 60 symmetrical with respect to an own axis 67, which is a characteristic surface of focus means 33.

Figure 16:
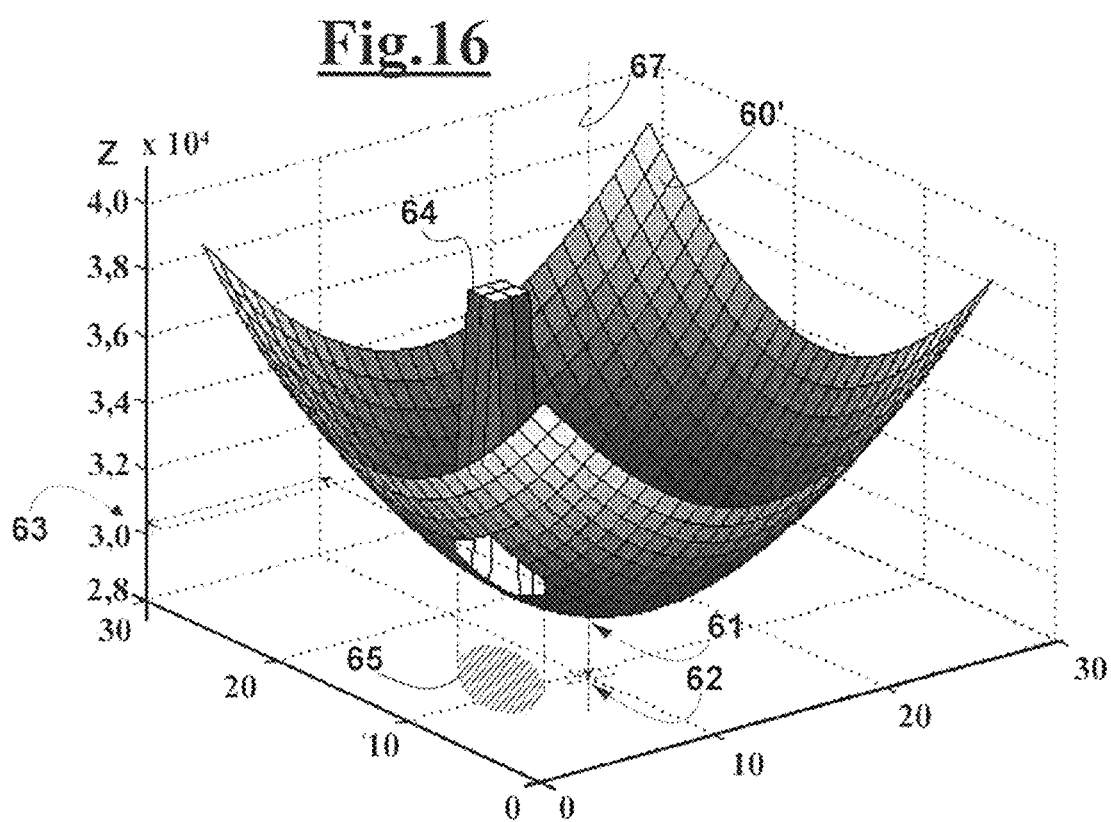
FIG. 16 shown the characteristic surface of an exemplary embodiment of the apparatus of FIGS. 1-3 for making authenticity mark by a focus defect in a region of the working area.

As shown in FIG. 16, in accordance with the fourth aspect of the invention, the characteristic surface of focus means 33 is a surface 60' that generally coincides with surface 60 of FIG. 15, apart from a region 65 of working area 12, at which the position of focus means 33 is determined by a portion 64 of characteristic surface 60'. In the case shown in FIG. 16, portion 64 is a frustum of a pyramid oriented towards a vertex located in the concave region of the space defined by characteristic curve 60'. Therefore, at the points of region 65 of the working area, which can be for example a zone at a predetermined position of a piece of document, the pattern will show an intentional focus defect on which can work as an authenticity mark, i.e. it can make possible to assess the authenticity of the piece of document and/or of the engraving.

The foregoing description various exemplary specific embodiments will so fully reveal the invention according to the conceptual point of view, so that others, by applying current knowledge, will be able to modify and/or adapt for various applications such embodiment without further research and without parting from the invention, and, accordingly, it is meant that such adaptations and modifications will have to be considered as equivalent to the exemplary embodiments described. The means and the materials to realize the different functions described herein could have a different nature without, for this reason, departing from the field of the invention. It is to be understood that the phraseology or terminology employed herein is for the purpose of description and not of limitation.

The invention claimed is:

1. A method for making laser engravings on a paper web, said method comprising the steps of:
   prearranging a web conveying means configured for conveying a paper web in a predetermined direction;
   defining a working area along a path of said web;
   prearranging a laser pulse emitter for emitting laser pulses that have a power set to form engravings on said web;
   prearranging a movable pointing means that comprises a reflection means and a focus means, said movable pointing means configured for sending said laser pulses into said working area;
   selecting an engraving pattern, comprising a plurality of points to be engraved on said web by said laser pulses emitted as pulse packets, said pattern associated with a first function that defines the position of said plurality of points in said working area with respect to a first reference system that is integral to said web;
   calculating an instruction file containing pointing instructions for operating said movable pointing means in such a way that a predetermined position of said movable pointing means corresponds to each pulse packet, a predetermined position of said plurality of points on said working area corresponding to said predetermined position of the movable pointing means;
   selecting an emission power of said laser pulse emitter;
   emitting laser pulses at said emission power through said emitter;
   operating said movable pointing means according to said instruction file, so that said movable pointing means sequentially reaches each predetermined position by continuously changing the direction of said laser pulses in said working area reproducing said pattern on said web;
   wherein said step of calculating an instruction file provides a transform of said first function from said reference system that is integral to said web, into a second reference system that is integral to said emitter, wherein a second transformed function is obtained, by said transform, which is defined in said working area, and wherein said instructions of said instruction file operate said pointing means in such a way that said laser pulses describe said transformed function with respect to said second reference system, in said working area, such that said packets of laser pulses reach said web, and engrave said pattern on said web as if said web were motionless.

2. The method according to claim 1, wherein said step of prearranging a movable pointing means comprises a step of prearranging galvanometers as actuators of said reflection means.

3. The method according to claim 1, comprising the steps of:
learning position data of a point of said web with respect to said second reference system that is integral to said emitter of laser pulses;
computing a conveying speed of said web; and wherein said transform of the first function from said reference system that is integral to said web, into said second reference system, which is integral to said emitter, is defined by a tracking correlation, that is, a tracking algorithm, comprising said speed,
wherein said tracking correlation is expressed by:

$$x''=x'-Xc(t)=v(t)*t \quad [1]$$

$$y''(t)=y'(t) \quad [2],$$

wherein:
x'', y'' are the coordinates of a true pointing position, that is, the coordinates of an engraving point of the pattern with respect to said second reference system that is integral to said emitter of said laser pulses;
x',y' are the coordinates of an engraving point of said pattern with respect to said reference system that is integral to said conveyed web;
Xc is the position, according to an advancement coordinate of the paper web;
v is the conveying speed of said web with respect to said second reference system that is integral to said emitter of said laser pulses,
wherein said method also comprises a step of computing an acceleration of moving said web, and said correlation also comprises the acceleration of said web,
wherein said correlation is expressed by:

$$x''=x'-Xc-v(t)*(t)-\tfrac{1}{2}a(t)t^2 \quad [3]$$

$$y''(t)=y'(t) \quad [4]$$

where:
a is the conveying acceleration said web with respect to said second reference system that is integral to said means of emission of laser pulses.

4. The method according to claim 1, further comprising the steps of:
printing said pattern on said web, thus obtaining a printed pattern;
reading at least one portion of said pattern printed on said web;
wherein said step of selecting an engraving pattern comprises a step of selecting said at least one portion of said printed pattern, and said instruction file comprises instructions for engraving said pattern in an engraving zone on said web corresponding to said printed pattern, such that a one-to-one correspondence is obtained on said a piece of document between said engraving, which reproduces a data field, and the same data field as shown on said piece of document,
wherein said step of reading comprises a step of scanning and optically recognizing types of said pattern printed on said web,
wherein said step of engraving provides the reproduction of types of said data field by removing an amount of material without perforating the piece of document, by a plurality of local abrasions of the piece of document.

5. The method according to claim 1, also comprising the steps of:
printing a predetermined activation or control code on said web;
reading and optically recognizing said activation or control code from said web upstream of said working area;
wherein said step of calculating said instruction file comprises a step of generating an instruction of engraving said pattern at a predetermined position on said web responsive to said activation or control code, which has been read and optically recognized.

6. The method according to claim 1, wherein said step of selecting an emission power comprises a step of defining a nominal emission power value and a plurality of increased emission power values higher than said nominal emission power value, and said step of emitting laser pulses is carried out by selecting in turn said emission power values decreasing between a first increased emission power value and a last increased emission power value and, subsequently, said nominal emission power value,
wherein said increased emission power values are selected and used as emission power values such that, in a starting period of said step of emitting, said emitter emits a laser pulse at an emission power set between said nominal power value and a power value that differs from said nominal power value within a predetermined value range,
wherein said emitter is operated according to a pulse-width modulation control signal in which a power emission duty-cycle is defined, and said plurality of increased power values is used for said nominal power through a step of changing said duty-cycle according to a working temperature of said emitter.

7. The method according to claim 1, wherein said pattern comprises two graphic elements which meet at a vertex forming a sharp angle, and said instruction file comprises first instructions for engraving first engraving points along the direction of a first segment and second instructions for engraving, after said first engraving points, second engraving points along the direction of said a second segment, and an instruction of adding a predetermined delay for prolonging a step of executing said first instructions, such that at least one engraving point is engraved at a distance from said vertex responsive to said delay, in order to obtain, in said pattern, as engraved on said web, at the intersection point of said two graphic elements, a connection of predetermined shape,
wherein a step is provided of correcting a trajectory in order to engrave a point of said second engraving points at a predetermined position along said second segment.

8. The method according to claim 1, wherein said pointing instructions of said instruction file comprise focus instructions for said focus means, wherein said focus means is operated in such a way that:
beams of said pulses directed by said pointing means reach with an own focus a first plurality of points of said web in said working area, and said beams reach a second plurality of points of said working area with said focus at a predetermined distance from said working area and from said web, such that an intentional focus defect is obtained at a region of said working area comprising said second plurality of points, wherein said focus instructions cause said focus means to:

take a same focusing position for directing said beams to said first plurality of points of said working area that have a same distance from a predetermined point of said working area, said point arranged to be substantially perpendicularly attained by said beams starting from said pointing means;

take a position different from said focusing position for directing said beams to said second plurality of points of said working area.

9. A method for making laser engravings on a paper substrate, said method comprising the steps of:

defining a working area;

prearranging said substrate in said working area;

prearranging a laser pulse emitter for emitting laser pulses that have a power set to form engravings on said substrate;

prearranging a movable pointing means that comprises a reflection means and a focus means, said movable pointing means configured for sending said laser pulses to said working area on said substrate;

selecting an engraving pattern to be engraved on said substrate by said laser pulses emitted as pulse packets;

calculating an instruction file containing pointing instructions for operating said movable pointing means in such a way that a predetermined position of said movable pointing means corresponds to each pulse packet, a predetermined position of said points on said working area corresponding to said predetermined position of the movable pointing means;

selecting an emission power of said laser pulse emitter;

emitting laser pulses at said emission power through said emitter;

operating said movable pointing means according to said instruction file, so that said movable pointing means sequentially reaches each predetermined position by continuously changing the direction of said laser pulses in said working area reproducing said pattern on said substrate;

wherein said step of selecting an emission power comprises a step of defining a nominal emission power value and a plurality of increased emission power values higher than said nominal emission power value, and said step of emitting laser pulses is carried out by selecting in turn said emission power values decreasing between a first increased emission power value and a last increased emission power value, wherein said increased emission power values are selected and used as emission power values such that, in a starting period of said step of emitting, said emitter emits a laser pulse at an emission power set between said nominal power value and a power value that differs from said nominal power within a predetermined value range.

10. The method according to claim 9, wherein said emitter is operated according to a pulse-width modulation control signal in which a power emission duty-cycle is defined, and said plurality of increased power values is used for said nominal power through a step of changing said duty-cycle according to a working temperature of said emitter.

11. A method for making laser engravings on a paper substrate, said method comprising the steps of:

defining a working area;

prearranging said substrate in said working area;

prearranging a laser pulse emitter for emitting laser pulses that have a power set to form engravings on said substrate;

prearranging a movable pointing means that comprises a reflection means and a focus means, said movable pointing means configured for sending said laser pulses to said working area on said substrate;

selecting an engraving pattern, comprising a plurality of points to be engraved on said substrate by said laser pulses emitted as pulse packets;

calculating an instruction file containing pointing instructions for operating said pointing means in such a way that a predetermined position of said movable pointing means corresponds to each pulse packet, a predetermined position of said points on said working area corresponding to said predetermined position of the movable pointing means;

selecting an emission power of said laser pulse emitter;

emitting laser pulses at said emission power through said emitter;

operating said movable pointing means according to said instruction file, so that said movable pointing means sequentially reaches each predetermined position by continuously changing the direction of said laser pulses in said working area reproducing said pattern on said substrate; wherein said pattern comprises two graphic elements, which meet at a vertex forming a sharp angle, wherein said instruction file comprises first instructions for engraving first engraving points along the direction of a first segment and second instructions for engraving, after said first engraving points, second engraving points along the direction of a second segment, and an instruction of adding a predetermined delay for prolonging a step of executing said first instructions, such that at least one engraving point is engraved at a distance from said vertex responsive to said delay, in order to obtain, in said pattern, as engraved on said substrate a connection of predetermined shape between said graphic elements.

12. The method according to claim 11, wherein a step is provided of correcting a trajectory in order to engrave a point of said second points at a predetermined position along said second segment.

13. A method for making laser engravings on a paper substrate, said method comprising the steps of:

defining a working area;

prearranging said substrate in said working area;

prearranging a laser pulse emitter for emitting laser pulses that have a power set to form engravings on said substrate;

prearranging a movable pointing means that comprises a reflection means and a focus means, said movable pointing means configured for sending said laser pulses to said working area on said substrate;

selecting an engraving pattern to be engraved on said substrate by said laser pulses emitted as pulse packets;

calculating an instruction file containing pointing instructions for operating said movable pointing means in such a way that a predetermined position of said movable pointing means corresponds to each pulse packet, a predetermined position of points on said working area corresponding to said predetermined position of the movable pointing means;

selecting an emission power of said laser pulse emitter;
emitting laser pulses at said emission power through said emitter;
operating said movable pointing means according to said instruction file, so that said movable pointing means sequentially reaches each predetermined position by continuously changing the direction of said laser pulses in said working area reproducing said pattern on said substrate;
wherein said pointing instructions of said instruction file comprise focus instructions for said focus means wherein said focus means is operated in such a way that:
beams of said pulses directed by said movable pointing means reach with an own focus a first plurality of points of said substrate in said working area, and
said beams reach a second plurality of points of said working area with said focus at a predetermined distance from said working area and, therefore, from said substrate, such that an intentional focus defect is obtained at a region of said working area comprising said second plurality of points.

14. The method according to claim 13, wherein said focus instructions cause said focus means to:

take a same focusing position for directing said beams to said first plurality of points of said working area that have a same distance from a predetermined point of said working area, said predetermined point arranged to be substantially perpendicularly attained by said beams starting from said pointing means;

take a position different from said focusing position for directing said beams to said second plurality of points of said working area.

* * * * *